D. S. WATSON.
FIRE SHIELD.
APPLICATION FILED AUG. 22, 1912.
Reissued Dec. 7, 1915.
14,028.
3 SHEETS—SHEET 1.
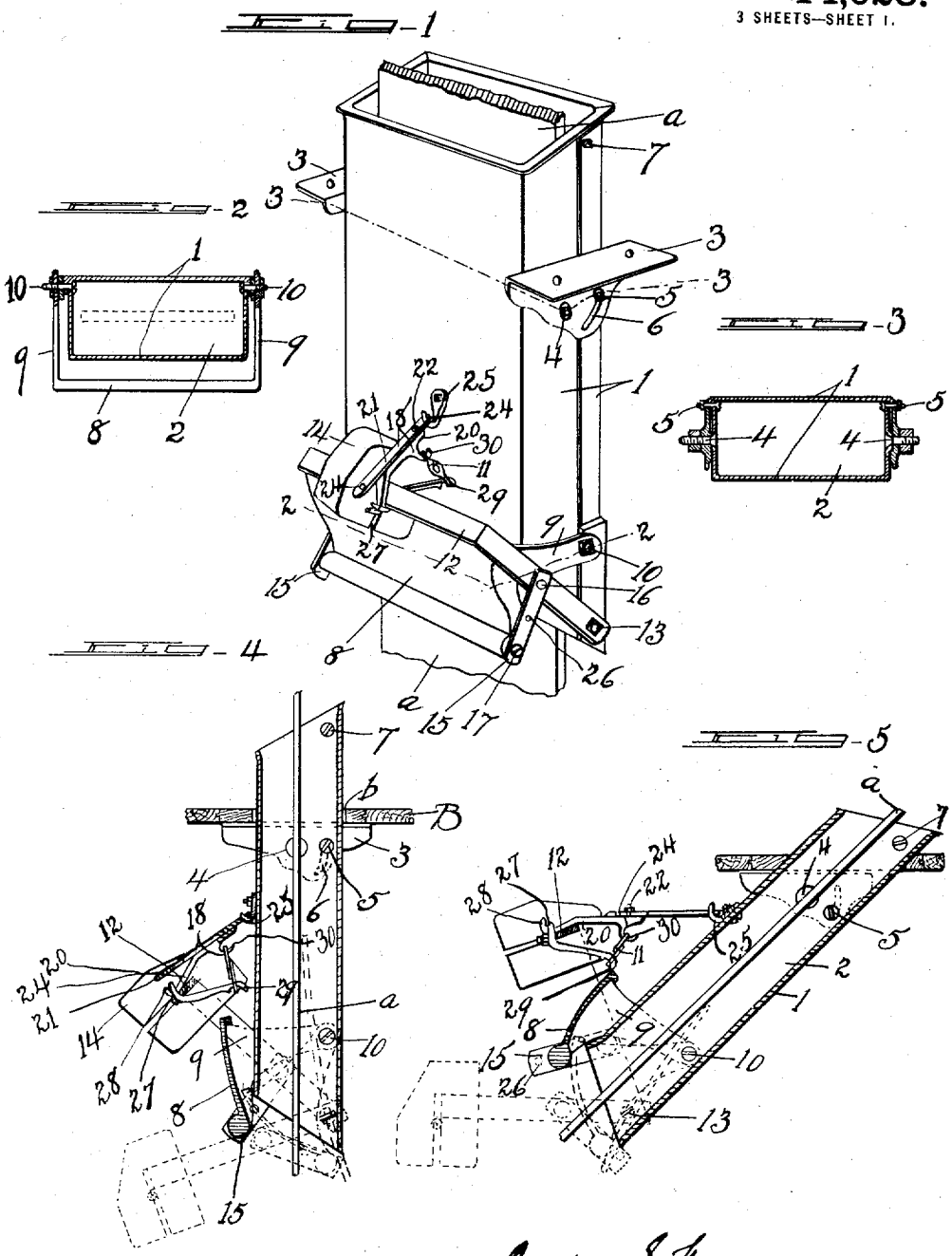
Witnesses:
S. J. Thomson
E. A. Thompson
David S. Watson Inventor
By Howard P. Denison Attorney
COLUMBIA PLANOGRAPH CO., WASHINGTON, D. C.

D. S. WATSON.

FIRE SHIELD.

APPLICATION FILED AUG. 22, 1912.

Reissued Dec. 7, 1915.

14,028.

3 SHEETS—SHEET 2.

David S. Watson
Inventor

Witnesses:
J. J. Aronson.
E. A. Thompson

By Attorney
Carroll P. Bruton

COLUMBIA PLANOGRAPH CO., WASHINGTON, D. C.

D. S. WATSON.

FIRE SHIELD.

APPLICATION FILED AUG. 22, 1912.

Reissued Dec. 7, 1915.

14,028.

3 SHEETS—SHEET 3.

Witnesses:

S. J. Aronson

E. A. Thompson

David S. Watson

Inventor

By Attorney Wm. P. Preston

COLUMBIA PLANOGRAPH CO., WASHINGTON, D. C.

UNITED STATES PATENT OFFICE.

DAVID S. WATSON, OF CANASTOTA, NEW YORK.

FIRE-SHIELD.

14,028. Specification of Reissued Letters Patent. Reissued Dec. 7, 1915.

Original No. 1,032,717, dated July 16, 1912, Serial No. 582,181. Application for reissue filed August 22, 1912. Serial No. 716,560.

*To all whom it may concern:*

Be it known that I, DAVID S. WATSON, of Canastota, in the county of Madison and State of New York, have invented new and useful Improvements in Fire-Shields, of which the following, taken in connection with the accompanying drawings, is a full, clear, and exact description.

This invention relates to certain improvements in fire shields for belt openings in floors, ceilings and walls of buildings for the purpose of normally permitting the free action of the belt through said opening and for automatically and effectively closing said opening and preventing the passage of fire or smoke therethrough in case of fire.

Reference is hereby made to my Patents Nos. 848,583 March 26, 1907; 889,737, June 2, 1908; 900,243, October 6, 1908; 1,032,717, July 16, 1912; 1,058,283, April 8, 1913, and 1,100,003, June 16, 1914; and also to the patent to R. J. Kittredge 1,021,535, March 26, 1912 of which I am now the sole owner by assignment; also to my pending applications, Serial Nos. 772,753, filed June 10, 1913; 811,719, filed January 12, 1914; 772,752, filed June 10, 1913; 651,415, filed September 6, 1911; 630,284, filed May 31, 1911 and 844,144, filed June 10, 1914, and allowed June 27, 1914 all relating to "heat-controlled fire shields or dampers".

The main object is to prevent the spread of fire from one room to another of a building through the belt openings and other passages.

Another object is to enable the shield to be readily adjusted to different angles to conform to that of the belt.

A further object is to cause the closure to operate with greatest force of pressure when it approaches or has reached its closing position so as to assure a more effective closing of the opening in the shield through which the belt passes.

Other objects and uses relating to specific parts of the device will be brought out in the following description.

Figure 6:
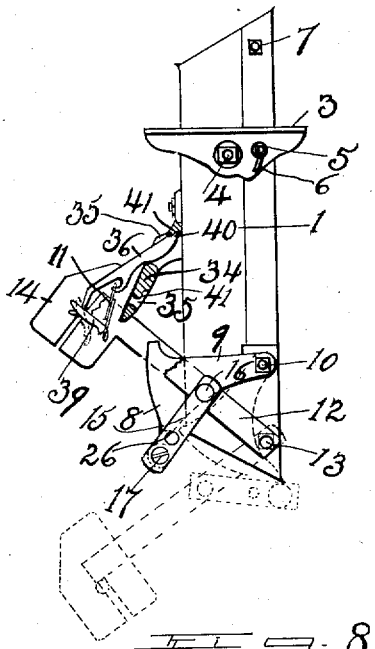
Figure 7:
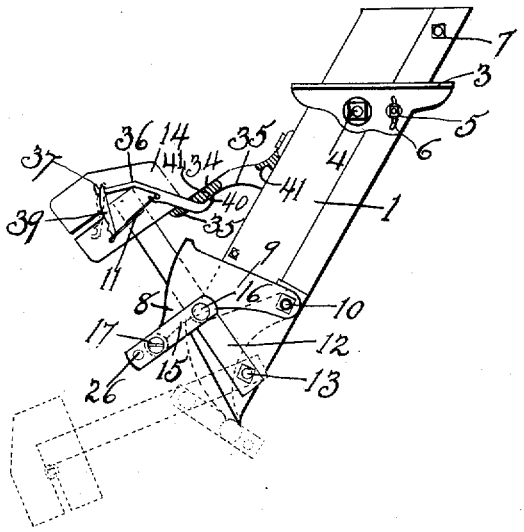
Figure 8:
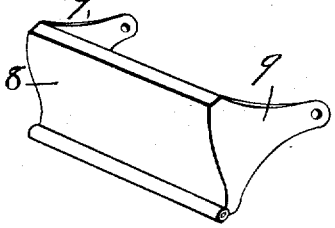
Figure 9:
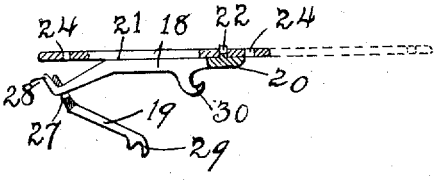
Figure 11:
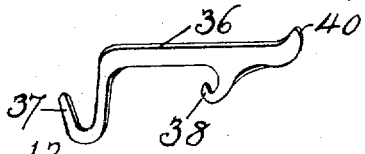
Figure 10:
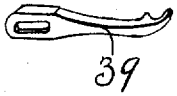
Figure 12:
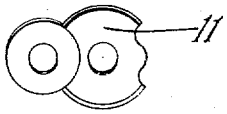
Figure 13:
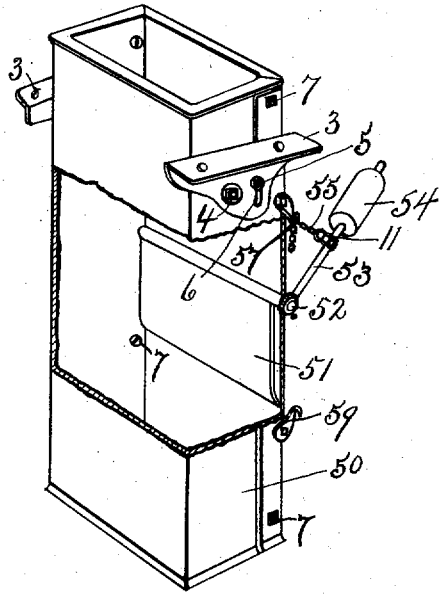
Figure 14:
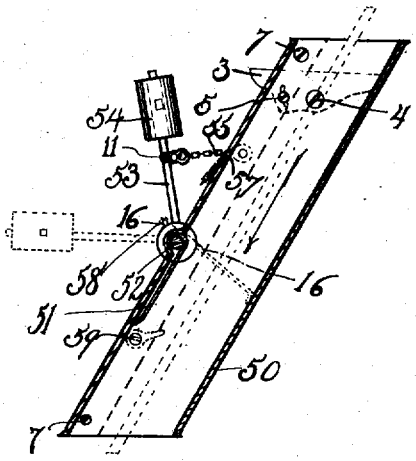
Figure 15:
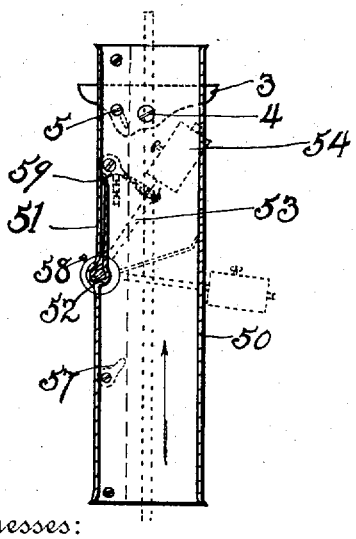
Figure 16:
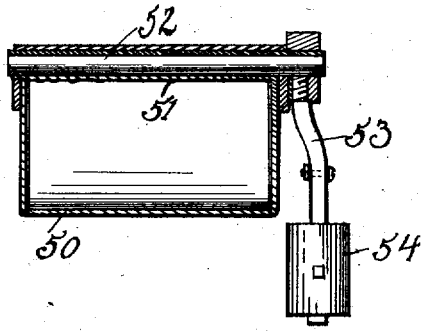

In the drawings Figure —1— is a perspective view of a fire shield for belt openings in floors and ceilings showing a portion of a vertically traveling belt therein, the closure being shown as held in its normal open position. Figs. —2— and —3— are transverse sectional views taken respectively on lines —2—2 and —3—3 Fig. —1— except that the bail and its connections with the closure are omitted in Fig. —2—. Fig. —4— is a transverse, vertical sectional view of the device shown in Fig. 1. Fig. 5 is a lengthwise sectional view similar to Fig. —4— showing the shield in an inclined position, the mechanism for holding the closure in its open position being adjusted in accordance with such angle to bring about the desired operation of the closure when released. Fig. —6— is a side elevation, partly in section, of a similar shield, showing a slightly modified form of retaining means for holding the closure in its open position, the shield being shown as used in connection with a vertically traveling portion of a belt. Fig. 7 is a side elevation, partly in section of the same device in a tilted position, the weighted closure operating device being adjusted to a different position from that shown in Fig. —6—. Fig. —8— is a perspective view of the detached closure. Fig. —9— is an enlarged sectional view, partly in elevation of the bail holding device shown in Figs. —1—, —4— and —5— except that the fusible member is removed. Figs. —10— and —11— are perspective views of the bail holding links shown in Figs. —6— and —7—. Fig. —12— is a perspective view of one of the parts of the fusible link. Fig. —13— is a perspective view of a further modified shield in which the hinged closure is arranged within the shell. Fig. —14— is a vertical sectional view of the same shield in an inclined position. Fig. —15— is a sectional view similar to Fig. —14— except in an inverted position and the weight adjusted accordingly. Fig. —16— is a transverse sectional view of the same shield taken on line 16—16, Fig. —13—.

This shield is adapted to be used in connection with a belt —*a*— passing through an opening —*b*— of a floor or ceiling —B— and comprises an elongated tubular shell —1— of sheet metal or equivalent heat resisting material having a passageway therethrough from end to end for the belt —*a*— and preferably of rectangular cross section to conform as nearly as possible to the cross sectional form of the belt, leaving ample clearance to prevent excessive friction between the belt and shell. This shield extends through the floor opening —*b*— some distance above and below the floor —B— and is provided with one or more, in this instance two separate brackets —3— at opposite sides thereof adapted to be secured by any suitable fastening means to the under side of the floor or ceiling —B— for holding the shield in operative position.

The shield and its supporting brackets are pivotally connected to each other by pivotal bolts —4— which permit the shield and brackets to be tilted or adjusted relatively to each other for the purpose of supporting the shield in an upright position or at different angles relatively to the floor to conform to the angle of travel of the portion of the belt with which the shield is associated and also permitting the bracket to be adjusted to conform to different angles of the floor or ceiling through which the belt passes, the shell —1— and brackets being held in their relatively adjusted positions by clamping bolts —5— which are located at one side of the axis of the pivots —4— and are preferably secured to opposite sides of the shell and project through elongated slots —6— in the brackets which slots are concentric with said axis.

In order that the shield may be placed in operative position around a belt without disconnecting the latter, one side of the shield is removable and normally secured to the main body by screws or bolts —7—. The entire shield is also reversible side for side to permit it to be used at different angles at opposite sides of a perpendicular or to permit the closure and its operating parts to be used at either side of the belt as may be necessary or desirable in placing the shield in operative position.

The object in extending the shell —1— a considerable distance above and below the plane of the floor —B— is to prevent the fire from passing through the belt opening by creeping under the floor or ceiling. As shown in Figs. —1—, —3— and —4—, the opposite ends of the shell —1— are beveled in planes converging in the same direction, the object in beveling the upper end being to allow the shell to project some distance through and above the floor when tilted to an angle as shown in Fig. —5— while the purpose in beveling the lower end is to cause its under side to form an abutment for the movable closure presently described. This closure preferably consists of a cast metal plate —8— having lateral projecting arms —9— which are pivoted by screws or bolts —10— to opposite sides of the shell —1— to support the said closure and permit it to be moved to and from a position across the belt passage —2—, said closure being of sufficient area to entirely close said passage when in its closed position. The distance between the axis of movement of the closure —8— and lower edge of the long side of the shell —1— is equal to or slightly greater than the radius of the arc of movement of the lower or advanced edge of said closure so as to form an abutment or limiting stop therefor. The opposite or shorter side of the shell —1— terminates within the arc of movement of the closure plate —8— which is therefore adapted to swing across the lower end of the passage way when the closure is released from its normal open position. This closure —8— is normally held in its open position by a suitable mechanism including a fusible detent —11— of soft solder or similar material which is destructible under a comparatively low degree of heat and although the closure is adjusted so as to close automatically by its own gravity when released, this closing movement is accelerated and made more effective and positive through the medium of a weighted bail —12— and suitable connections with the closure when the fusible detent is destroyed.

The weighted bail —12— forms a part of the mechanism for retaining the closure in its normal position and preferably consists of a U shaped bar having the ends of its opposite arms pivoted by bolts or screws —13— to the opposite sides of the shell —1— preferably near the lower end thereof and below the pivotal bolts —10—, the intermediate portion of the bail being supported some distance beyond the closure —8— at the same side of the shell and is provided with a removable weight —14—.

The arms of the bail —12— are connected intermediate their ends to the opposite ends of the front edge of the closure —8— by means of links —15— which are attached to said arms and to the closure by means of pivotal bolts or screws —16— and —17— as best seen in Fig. —1—, the pivots —16— being normally disposed in a plane above a straight line drawn between the pivots —10— and —17— when the closure is held in its open position, so as to assure the closing of the plate —8— across the lower end of the shell —1— when the fusible detent —11— is destroyed.

The bail —12— is normally held in a position at an angle with the vertical plane of its axis so as to readily drop when released and is preferably adjusted to assume substantially a horizontal plane when the closure —8— reaches the limit of its closing movement so as to cause said closure to press the belt with a maximum leverage produced by the weight —14— against the abutment, thereby cutting off the passage of the flame through the shell —1— in case of fire, it being understood that if the portion of the belt impinged between the closure and abutment should be burned away, said closure will be forced by the weighted bail directly against said abutment. It is now clear that when the bail is raised to the position shown by full lines in Figs. —1—, —4—, and —5— the closure —8— will be full open, leaving a clear passage-way for the belt through the shell —1—.

In order that the weighted bail may assume the two extreme positions just described when the shell is disposed vertically as shown in Fig. —4— or at an angle as shown in Fig. —5—, I provide an adjustable connection between said bail and the shell —1— and also provide a corresponding adjustment of the link connection —15— between the bail —12— and closure —8—. The connection between the bail and shell which serves to hold the weighted bail and closure in its normal position preferably comprises detachably interlocked links —18— and —19— and the fusible detent —11— which normally connects said links and holds them in operative position. The sections —20— and —21— pivotally connected at —22— near one end of the section —21—, the latter section being provided with apertures —24— at opposite sides of and different distances from the pivot, either of which is adapted to engage with a hook-shaped anchorage —25— on the shell —1— for holding the bail and closure in normal position nearer to or farther from the shell according to the vertical or tilted position of said shell. For the same reason, the link —15— is provided with separate sets of apertures —26— at different distances from their pivots —16—, those of either set being adapted to receive the pivotal bolts or screws —17—. The link —19— is provided with a slotted offset —27— normally interlocked in a hook-shaped extremity —28— of the link section —20—, the opposite end of the link —19— being formed with a hook —29— which is connected by the fusible detent or link —11— to a corresponding hook —30— on the adjacent end of the link section —20—. The link —18— is disposed in a plane nearly tangential to the arc of movement of the outer end of the bail —12— so that the strain thereon is nearly in a direct line between the bail and anchorage —25—, the outer end of the link section —20— lying in close proximity to the outer face of the bail. The link —19— which is interlocked at its outer end with the hook —28— extends across the front edge of and under the bail where it is connected by the link —11— to the hook —30— by the detent —11— so that the weight of the bail normally presses against the offset of the link —19— tending to rock said link —19— upon its fulcrum when the fusible detent —11— is destroyed by heat and at the same time the normal strain upon the fusible detent is reduced to a minimum by reason of the engagement of the bail with the link —19— close to its fulcrum.

When the shield is used in a vertical or approximately a vertical position as shown in Fig. —4—, the link section —21— is adjusted about its pivot so as to engage its shorter arm with the anchorage —25— and at the same time the closure —8— is connected to the outermost apertures —26— of the links —15— farthest from the pivots —16—; on the other hand when the shield is tilted to a considerable angle as shown in Fig. —5—, the link section —21— is adjusted so as to connect its longer arm with the anchorage —25— while the closure —8— is connected to the innermost apertures —26— nearest the pivots —16—. These adjustable connections therefore permit the same shield to be used in connection with belt openings in widely divergent angles. It is evident, however, that this adjustment may be made by various other mechanisms and in Figs. —6— and —7— I have shown a modified form of connection between the bail and shell consisting of an anchorage or bracket —34— secured to the shell —1— and provided with a plurality of, in this instance, two apertures —35— at different distances from the bail —12— for the reception of one end of a link —36— which is somewhat similar to the link section —20— in that it is provided with a pair of hooks —37— and —38— to be engaged respectively by a link —39— and a fusible detent —11—. The inner end of the link —36— is adapted to be inserted through either of the apertures —35— according to the position in which the shell is placed and terminates in a hook or shoulder —40— for interlocking engagement with one or the other of a pair of recesses —41— on the inner face of the bracket —34— just above the apertures —35—.

When the shield is in approximately a vertical position as shown in Fig. —6—, the inner end of the link —36— is interlocked in the upper aperture —35— while the closure —8— is connected by the pivotal bolts —17— to the lowermost apertures —26— in the links —15—. On the other hand when the shield is tilted to a considerable angle from a vertical position as shown in Fig. —7—, the link —36— is interlocked in the lower aperture —35— and the closure —8— is connected to the uppermost apertures —26— in the links —15—. The link —39— is somewhat similar to the corresponding link —19— except that it is more nearly straight from end to end and instead of passing inwardly under the bail simply extends across the outer or lower edge thereof, and its inner end is connected by the fusible link —11— to the hook —38—; otherwise the shield shown in Figs. —6— and —7— is substantially the same as shown in Figs. —1— —4— and —5—. The slot in each of the links —19— and —39— for receiving the corresponding hooks —28— and —37— are of slightly less length than the lengths of the outer ends of said hooks so as to prevent said links from becoming accidentally detached when in their holding positions, the same being true also of the connections of the fusible detent —11— and hooks with which they are engaged.

In operation in case of fire the shell —1— projecting as it does above and beneath the plane of the floor prevents the fire from creeping along the surface of said floor or ceiling and through the opening and at the same time the heat from such fire will quickly destroy the integrity of the fusible detent —11— releasing the link —19— or —39— and allowing the weighted lever to descend by its own gravity, thereby forcing the said link from its holding position and effectively shifting the closure —8— to its closed position as shown by dotted lines in Figs. —4— and —5— until the advance edge of said closure impinges the belt against the adjacent edge of the opposite side of the shell, the weighted bail —12— being thus in a substantially horizontal position and exerting a considerable pressure tending to hold said closure in its closed position even though the impinged portion of the belt may be burned away. It may happen that this action will take place during the operation of the belt. In order to prevent any damage to the apparatus, the coacting edges of the closure and shell are rounded as more clearly shown in Figs. —4— and —5— to allow the belt to travel between said coacting parts even though the closure may be in its closed position.

In Figs. —13— to —16— inclusive is shown a sheet metal tubular shell 50 adapted for the passage of a belt therethrough or for the reception of any other materials which it may be desired to pass through an opening in a floor or partition said shell being equipped with a self-closing door or closure —51— hinged to one side thereof and adapted to swing from its normally open position across the passage-way to effectively close the latter. For this purpose, the closure is of substantially the same or slightly greater area than the cross sectional area in which it is located and is preferably secured to a rock-shaft —52—, the latter being journaled in suitable bearings in one side of the chute or shield proper. Secured to the rock-shaft preferably at the outside of the shell —50— is a crank arm —53— carrying a weight —54— which is adjustable lengthwise thereon and of sufficient weight to automatically close and hold the door in its closed position. The weighted arm is normally held at a slight angle from a vertical position by means of a chain —55— and fusible detent —11— to normally hold the door in its extreme open position, leaving a clear passage-way for a belt or other article or articles which it may be desired to pass through the shell, the fusible link —11— forming a part of the connection between the chain and weighted arm —53— while the links of the chain are adapted to be engaged with a hook-shape anchorage —57— on the adjacent side of the shell to permit the weighted arm —53— to be adjusted to the proper angle when the shell is arranged at an angle from a vertical position. If a belt is passed through the opening and adapted to travel downward, the closure —51— usually extends downwardly from the rock-shaft close to one side of the shell and is adapted to swing upwardly to its closed position when the weighted arm —53— is released by the destruction of the fusible link —11—. The same shield may, however, be used in connection with a belt traveling upwardly and for this purpose the weighted arm —53— is adjustable rotarily on the rock-shaft and held in position by a set-screw —58— thereby permitting the weighted arm to be adjusted to the proper angle for automatically swinging the closure downwardly to its closed position when the weighted arm is released by the destruction of the fusible link —11—. The same shield may, however, be used in connection with a belt traveling upwardly and for this purpose the weighted arm —53— is adjustable rotarily on the rock-shaft and held in position by a set-screw —58—, thereby permitting the weighted arm to be adjusted to the proper angle for automatically swinging the closure downwardly to its closed position when the weighted arm is released by the destruction of the detent. In order that the weighted arm may be held in its normal position when the shield is inverted, the opposite end of said shell is also provided with a hook-shape anchorage —59— to which one of the links of the chain is adapted to be attached.

What I claim is:

1. A fire shield comprising a tubular shell having an opening therethrough from end to end, a movable closure for the opening, a weighted operating member and adjustable connections between it and the closure for operating the latter and means including a fusible member for holding the weighted member against action by its own weight.

2. A fire shield comprising a tubular shell, a normally open swinging closure hinged to the shell, a weighted member and connections between it and the closure for automatically closing the said closure, adjustable connections between the weighted member and the shell for holding the said weighted member against action by its own weight, said connections having one of the members destructible under a comparatively low degree of heat.

3. A fire shield comprising a tubular shell open at both ends, a swinging closure for the shell pivoted thereto. a weighted member also pivoted to the shell, adjustable connections between the member and closure and heat controlled means for holding the member against action by its own weight.

4. A fire shield comprising a tubular shell open at both ends, a closure for the shell pivoted thereto and normally open, a weighted member and connections between it and the closure for closing the latter and detachably interlocking links engaging the member near the points of connection, a connecting member between said links destructible by a low degree of heat and connections between one of said links and the shell.

In witness whereof I have hereunto set my hand on this 8th day of August, 1912.

DAVID S. WATSON.

Witnesses:
EUGENE A. THOMPSON,
EVA E. GREENLEAF.

Copies of this patent may be obtained for five cents each, by addressing the "Commissioner of Patents, Washington, D. C."